(12) United States Patent
Rieks et al.

(10) Patent No.: US 11,648,520 B2
(45) Date of Patent: May 16, 2023

(54) BAFFLES IN A FLUIDIZED BED COOLER

(71) Applicants: THYSSENKRUPP FERTILIZER TECHNOLOGY GMBH, Dortmund (DE); thyssenkrupp AG, Essen (DE)

(72) Inventors: Rositsa Marianova Rieks, Leverkusen (DE); Thomas Gerner, Dortmund (DE)

(73) Assignees: THYSSENKRUPP FERTILIZER TECHNOLOGY GMBH, Dortmund (DE); THYSSENKRUPP AG, Essen (DE)

( * ) Notice: Subject to any disclaimer, the term of this patent is extended or adjusted under 35 U.S.C. 154(b) by 209 days.

(21) Appl. No.: 16/954,237

(22) PCT Filed: Jan. 8, 2019

(86) PCT No.: PCT/EP2019/050299
§ 371 (c)(1),
(2) Date: Jun. 16, 2020

(87) PCT Pub. No.: WO2019/135006
PCT Pub. Date: Jul. 11, 2019

(65) Prior Publication Data
US 2020/0360887 A1    Nov. 19, 2020

(30) Foreign Application Priority Data
Jan. 8, 2018    (EP) .................................... 18150582

(51) Int. Cl.
| | | |
|---|---|---|
| *B01J 2/00* | (2006.01) | |
| *B01J 8/00* | (2006.01) | |
| *B01J 8/18* | (2006.01) | |

(Continued)

(52) U.S. Cl.
CPC ................ *B01J 8/34* (2013.01); *C05C 3/005* (2013.01); *C05C 9/005* (2013.01); *F28D 13/00* (2013.01);

(Continued)

(58) Field of Classification Search
CPC ......... B01J 2/00; B01J 2/16; B01J 8/00; B01J 8/18; B01J 8/24; B01J 8/34; B01J 19/00;

(Continued)

(56) References Cited

U.S. PATENT DOCUMENTS

| | | | |
|---|---|---|---|
| 2,900,668 A | 8/1959 | Hubner | |
| 4,154,581 A * | 5/1979 | Nack | ........................ B01J 8/388 48/210 |

(Continued)

FOREIGN PATENT DOCUMENTS

| | | |
|---|---|---|
| CN | 204 388 653 U | 6/2015 |
| DE | 2205135 A | 8/1972 |

(Continued)

OTHER PUBLICATIONS

DIN ISO 9277—Determination of the specific surface area of solids by gas absorption—BET method (ISO 9277:2010), English translation of DIN ISO 9277:2014-01, (Jan. 2014).

*Primary Examiner* — Natasha E Young
(74) *Attorney, Agent, or Firm* — thyssenkrupp North America, LLC

(57) ABSTRACT

A fluidized bed cooler for cooling a urea-containing granular material may include a cooler chamber having a product inlet opening, a product outlet opening, a perforated plate disposed in the cooler chamber, and at least one cooling medium entry opening disposed beneath the perforated plate. The product inlet opening may be disposed above the perforated plate, and a baffle plate may be disposed between the product inlet opening and the perforated plate. A distributor plate may be disposed between the baffle plate and the perforated plate. An area of the distributor plate may be 10% to 50% greater than an area of the baffle plate.

16 Claims, 4 Drawing Sheets

(51) Int. Cl.
  *B01J 8/24* (2006.01)
  *B01J 8/34* (2006.01)
  *B01J 19/00* (2006.01)
  *B01J 19/24* (2006.01)
  *C05C 3/00* (2006.01)
  *C05C 9/00* (2006.01)
  *F28D 13/00* (2006.01)

(52) U.S. Cl.
  CPC ............ *B01J 2208/0084* (2013.01); *B01J 2219/00076* (2013.01)

(58) Field of Classification Search
  CPC ............ B01J 19/24; B01J 2208/00; B01J 2208/00796; B01J 2208/00823; B01J 2208/00831; B01J 2208/0084; B01J 2219/00; B01J 2219/00049; B01J 2219/00051; B01J 2219/00074; B01J 2219/00076; B01J 2219/24; C05C 3/00; C05C 3/005; C05C 9/00; C05C 9/005; F28D 13/00
  See application file for complete search history.

(56) References Cited

U.S. PATENT DOCUMENTS

| 4,219,589 | A | 8/1980 | Goethals |
| 4,330,319 | A | 5/1982 | Bexton |
| 4,536,418 | A | 8/1985 | Goldsmith |
| 4,701,353 | A | 10/1987 | Mutsers |
| 8,603,211 | B2 * | 12/2013 | Rahn ............ C05G 5/30 71/30 |
| 2006/0123602 | A1 | 6/2006 | Eygelaar |

FOREIGN PATENT DOCUMENTS

| DE | 31 16 778 A | 2/1982 |
| DE | 44 16 666 C | 8/1995 |
| DE | 602004002961 T | 7/2007 |
| GB | 1340302 A | 12/1973 |
| WO | 9403267 A | 2/1994 |
| WO | 2005/007619 A | 1/2005 |
| WO | 2010/060535 A | 6/2010 |

* cited by examiner

US 11,648,520 B2

BAFFLES IN A FLUIDIZED BED COOLER

CROSS REFERENCE TO RELATED APPLICATIONS

This application is a U.S. National Stage Entry of International Patent Application Serial Number PCT/EP2019/050299, now WO2019/135006, filed Jan. 8, 2019, which claims priority to European Patent Application No. EP 18150582.7, filed Jan. 8, 2018, the entire contents of both of which are incorporated herein by reference.

FIELD

The present disclosure generally relates to a fluidized bed cooler for cooling a urea-containing granular material, to a fluidized bed granulation plant for production of a granular fertilizer, and to methods for cooling a granular fertilizer.

BACKGROUND

In view of global population growth, the development of flexible and efficient fertilizers is of major and growing significance. Important factors here are not just the fertilizer itself, i.e. the chemical composition, but also the processing operations in transportable containers and the deployment in the field. The greatest significance here certainly attaches to the granulation to give uniform particles of the same size and characteristics. Important parameters here are low dust formation, strength, low tendency to aggregate, homogeneous size, storability and stability. An established granulation technique is fluidized bed granulation, which has improved particle properties compared, for example, to the prilling and pelletizing techniques.

One example for production of a urea-containing granular fertilizer by means of fluidized bed granulation can be found in WO 2010/060535 A1, for example in paragraphs [0025]-[0035], FIG. 1 or U.S. Pat. No. 4,701,353 A, DE 31 16 778 A1 and U.S. Pat. No. 4,219,589 A.

A very high proportion of global fertilizer production is accounted for by urea-containing fertilizers. This water-soluble fertilizer breaks down in the soil to give ammonium salts or nitrates and is an important base fertilizer. This urea-containing fertilizer can be combined with further elements such as potassium, phosphates, trace elements or sulfur compounds.

The use of urea-sulfur fertilizers in agriculture has already long been known. In such fertilizer mixtures, the plant can be provided simultaneously with the two elements nitrogen and sulfur, such that steps and costs for deployment of a further fertilizer can be dispensed with. In combination with urea, this enables, for example, supply of the sown plants at an early stage with nitrogen via the urea and with sulfur in the subsequent growth phases.

For that reason, urea-sulfur fertilizers having a homogeneous distribution of urea and sulfur are becoming increasingly important. Examples can be found, for example, in U.S. Pat. No. 4,330,319 A.

In order to assure good solubility of the nitrogen-containing salts or good biodegradability of the elemental sulfur in the soil, particles of minimum size are necessary. By comparison with larger particles, these small particles have a greater surface-to-volume ratio. This greater surface area, especially the greater specific surface area (determinable, for example, by the BET method, for example to DIN ISO 9277), improves the accessibility of the nitrogen-containing salts or the elemental sulfur for the plant or microorganisms present in the soil.

The particles obtained in the fluidized bed granulator, as a result of the process, have a relatively high temperature in the range of frequently 90-100° C. The particles present in this temperature range are generally quite soft and must be cooled prior to further treatment. For this purpose, the still-hot particles are transferred into a product cooler. This is frequently akin to the fluidized bed granulator in its makeup. This cooler consists, for example, of an upper part and a lower part. The granular material flows through the upper part of the cooler and is cooled with the air flowing into the lower part. By means, for example, of a perforated plate and cooling medium entry opening disposed beneath the perforated plate, the granular material is both cooled, for example by means of an air stream or (inert) gas stream, and also transferred as fluid medium from the inlet region into the outlet region of the cooler. In smaller plants, the upstream cooling zone may also be designed as part of the granulator. Over and above a daily production of about 2500 mtpd (megatons per day) of urea, however, the cooling zone is generally configured as a separate unit alongside the fluidized bed granulator owing to the necessary dimensions.

In the course of transfer of the granular material produced in the granulator into the cooler, there is frequently accumulation of granular material beneath the perforated plate. If these accumulations in the fluidized bed cooler continue to grow, these can generally be purged and removed in a complex manner only by shutting down the cooler and hence generally also the granulator. Any shutdown is inevitably associated with a production outage and a costly restart of the plant.

WO 94/03267 A1 discloses a method of fluidized bed granulation with the aid of a formaldehyde-containing additive.

WO 2005/007619 A1 discloses a method of producing a granular urea. The fluidizing air contains fine droplets.

DE 44 16 666 C1 discloses an apparatus for dewatering and drying solids, especially underwater-pelletized solids, by means of a pipe provided with dewatering openings. The pipe has been flattened off by a full-length axial and essentially diametrically upright water-permeable baffle plate.

GB 1,340,302 A discloses a drum cooler for granular materials with integrated baffle plates.

DE 60 2004 002 961 T2 discloses a fluidized bed granulation process for granulation of urea, for example.

CN 204388653 U discloses a cooling apparatus for cooling of granules from fluidized bed granulation.

Thus a need exists for a fluidized bed cooler in which the formation of granular material accumulations, especially beneath the perforated plate, is avoided or reduced.

DETAILED DESCRIPTION

Figure 1:
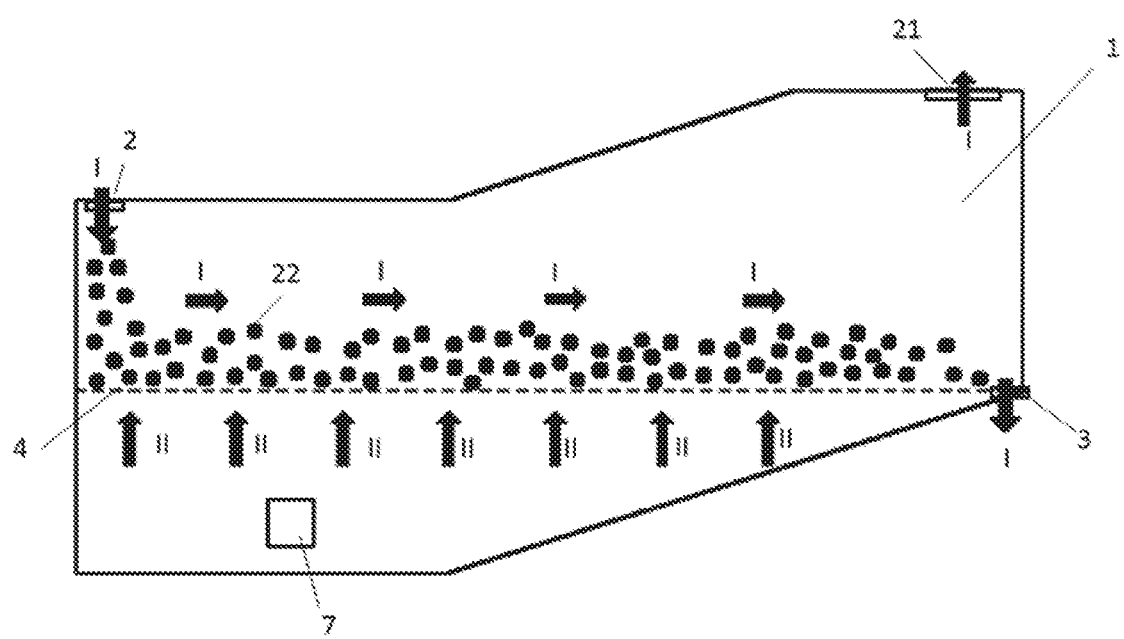
FIG. 1 is a schematic cross-sectional view through a prior art fluidized bed cooler.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention further encompasses a fluidized bed granulation plant for production of a granular fertilizer, the use of the fluidized bed granulation plant for production of a granular fertilizer, and a method of cooling a granular fertilizer. Further advantageous configurations can be found in the dependent claims.

The fluidized bed cooler of the invention for cooling of a urea-containing granular material comprises at least one cooler chamber with a product inlet opening, a product outlet opening and a perforated plate disposed in the cooler chamber. The perforated plate preferably divides the cooler chamber into a lower cooler chamber beneath the perforated plate and an upper cooler chamber above the perforated plate. Below the perforated plate is disposed at least one or more than one cooling medium entry opening. Through the cooling medium entry opening, a cooling medium, for example air or an inert gas, is introduced into the lower cooler chamber beneath the perforated plate. The perforated plates distributes the cooling medium within the granular material in the fluidized bed. The product inlet opening is disposed above the perforated plate. In addition, a baffle plate is disposed between the product inlet opening and the perforated plate. The baffle plate surprisingly enables attenuation of the velocity of the granular material particles that enter the cooler chamber via the product inlet opening without leading to significant deformation of the granular material particles.

Preferably, the baffle plate is disposed in the range from 30% to 80% of the distance proceeding from the product inlet opening toward the perforated plate.

The use of the baffle plate in the fluidized bed cooler of the invention surprisingly reduces the formation of lumps of granules on and beneath the perforated plate by up to 90%.

In a preferred configuration, a distributor plate is disposed between the baffle plate and the perforated plate. The distributor plate brings about a further reduction in the kinetic energy of the granular material particles and more homogeneous transfer of the granular material particles into the cooling region of the fluidized bed cooler above the perforated plate present fluid granular material particles.

Preferably, the area of the distributor plate is 10% to 50%, more preferably 25% to 40%, greater than the area of the baffle plate. The greater area of the distributor plate permits transfer of the granular material particles over an even larger area and hence in an even more homogeneous manner into the cooling region of the fluidized bed cooler above the perforated plate.

In a further preferred configuration, the baffle plate is in planar or three-dimensionally curved form. The curvature of the baffle plate may, for example, be convex, concave, saddle-shaped, or in the form of a complex mixed form of concave and convex elements. Particular preference is given to roof-shaped, trapezium-shaped, saddle-shaped, concentric or three-dimensionally Gaussian configurations of the baffle plate. The edges of the baffle plate may be curved or in the form of straight edges, and in mixed forms.

Preferably, the distributor plate and/or the baffle plate are in the form of perforated plates. The form of the perforated plate additionally improves the distribution of the granular material in the fluidized bed cooler.

The baffle plate and/or the distributor plate preferably contains metals, metal alloys, composite materials and/or plastics, more preferably steel, stainless steel, iron, chromium, aluminum, vanadium, nickel and/or polymers.

In a preferred configuration, the distributor plate and/or the baffle plate has openings having an average diameter of 10 mm to 50 mm, preferably of 15 mm to 30 mm. The formation of correspondingly dimensioned openings additionally improves the distribution of the granular material in the fluidized bed cooler.

The distributor plate preferably has borders. This border increases the stability of the distributor plate.

In a further preferred embodiment, the distributor plate and/or the baffle plate has a reinforcement with the product inlet opening (2). This reinforcement increases the stability of the distributor plate and/or the baffle plate, since they are subject to continuous stress by the granular material that arrives in the fluidized bed cooler with high kinetic energy. The reinforcement fixes the position and enables the optimal distribution of the granular material particles.

The baffle plate preferably has less than 10%, more preferably less than 5%, especially preferably less than 2%, of the area of the perforated plate. The area ratio stated is sufficient to assure a necessary reduction in the velocity and hence the kinetic energy of the granular material introduced into the fluidized bed cooler.

Further preferably, the baffle plate is arranged parallel to the perforated plate. The expression "parallel to the perforated plate" in the context of the invention preferably also includes angular variances from an ideal parallel arrangement of less than plus/minus 10 degrees. The stated geometry enables a necessary reduction in the velocity and hence in the kinetic energy of the granular material introduced into the fluidized bed cooler.

The invention further relates to a fluidized bed granulation plant for production of a granular fertilizer. The fluidized bed granulation plant comprises at least one fluidized bed granulator having a perforated granulator plate, seed grain inlet, fluidization gas inlet and at least one melt nozzle with an atomization gas inlet. The fluidized bed granulator generally has a granulator chamber, the perforated plate disposed in the granulator chamber, and spray nozzles of the invention disposed in/on the perforated plate. The spray nozzles of the invention are preferably connected to feeds for melt composed, for example, of urea or urea/sulfur mixtures, and a feed for the atomization gas. The fluidized bed present in the granulator is connected to a fluidizing gas stream, preferably air. The seed grains present in the fluidized bed grow through contact with the melt droplets generated in the atomization medium. The finished particles are subsequently transferred to a first fluidized bed cooler, for example via a granulator outlet. In addition, the fluidized bed granulation plant has granulation promoters, sieves, crushers and product coolers. The fluidized bed granulation plant of the invention is characterized in that the first fluidized bed cooler and/or the product cooler have a setup of the invention as described above. The fluidized bed cooler has at least one cooler chamber with a product inlet opening, a product outlet opening, a perforated plate disposed in the cooler chamber, and at least one cooling medium entry opening disposed beneath the perforated plate. The fluidized bed cooler of the invention as described above is characterized in that the product inlet opening is disposed above the perforated plate, and a baffle plate is disposed between the product inlet opening and the perforated plate. There is preferably a distributor plate disposed between the baffle plate and the perforated plate.

In a preferred configuration, the fluidized bed granulator and/or fluidized bed cooler is connected to a waste air treatment unit. The waste air treatment unit preferably comprises at least one or more than one of the following elements: scrubber and/or acidic scrubber, preferably scrubber and/or acidic scrubber with a neutralization unit connected to the acidic scrubbing. The neutralization can be effected by addition of ammonia, for example. Illustrative configurations can be found in WO2010/060535 A1.

The invention further encompasses the use of the above-described fluidized bed granulation plant of the invention for production of a granular fertilizer containing ammonium compounds, nitrates, phosphates, urea, elemental sulfur, ammonium sulfate, UAS (urea ammonium sulfate) and/or mixtures thereof. More preferably, the above-described fluidized bed granulation plant of the invention is used for production of a urea-containing granular fertilizer.

The invention further relates to a method of cooling a granular fertilizer, comprising the introduction of a granular material from a fluidized bed granulator or granulation promoter in a fluidized bed cooler of the invention as described above.

FIG. 1 shows a schematic cross section through a fluidized bed cooler according to the prior art. The fluidized bed cooler comprises a cooler chamber (1) into which the product (22) is introduced via a product inlet opening (2). The product (22), for example a urea-containing granular material, arrives in a non-attenuated manner in the fluidized product (22) already present on a perforated plate. Beneath the perforated plate (4) is disposed a cooling medium entry opening (7) that generates a gas stream (II) indicated by the black arrows. The gas stream (II) used is generally air; according to the substance to be granulated, it is alternatively also possible to introduce an inert gas. The product (22) present on the perforated plate in the cooler chamber (1), as a fluidized medium, moves in the direction of the product outlet opening (3) in the product stream (I). Removal of air from the cooler chamber is possible via an air removal opening (21).

Figure 2:
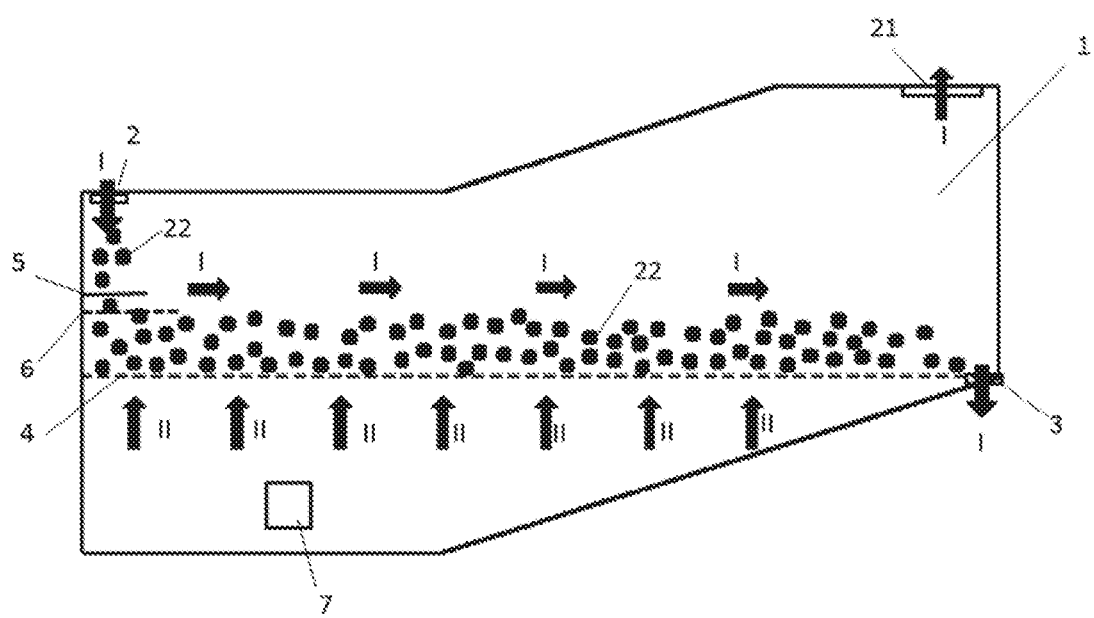
FIG. 2 is a schematic cross-sectional view through an example fluidized bed cooler.

FIG. 2 shows a schematic cross section through a fluidized bed cooler of the invention. The basic setup of the fluidized bed cooler corresponds to the setup described above for FIG. 1. By contrast with the fluidized bed cooler according to the prior art as described in FIG. 1, a baffle plate (5) and a distributor plate (6) are disposed between the product inlet opening (2) and the perforated plate (4). The baffle plate (5) enables attenuation of the incoming product (22) without noticeable destruction or deformation of the granular form of the product (22). The distributor plate (6) enables further attenuation and more homogeneous introduction of the product (22) flowing in in direction (I). The inventive arrangement of baffle plate (5) and preferably the distributor plate (6) reduces the accumulation of product beneath the perforated plate and hence extends the service life of the fluidized bed cooler. At the same time, there is a drop in the costs for the cleaning of the product cooler and the associated shutdown time of the fluidized bed granulation plant.

Figure 3:
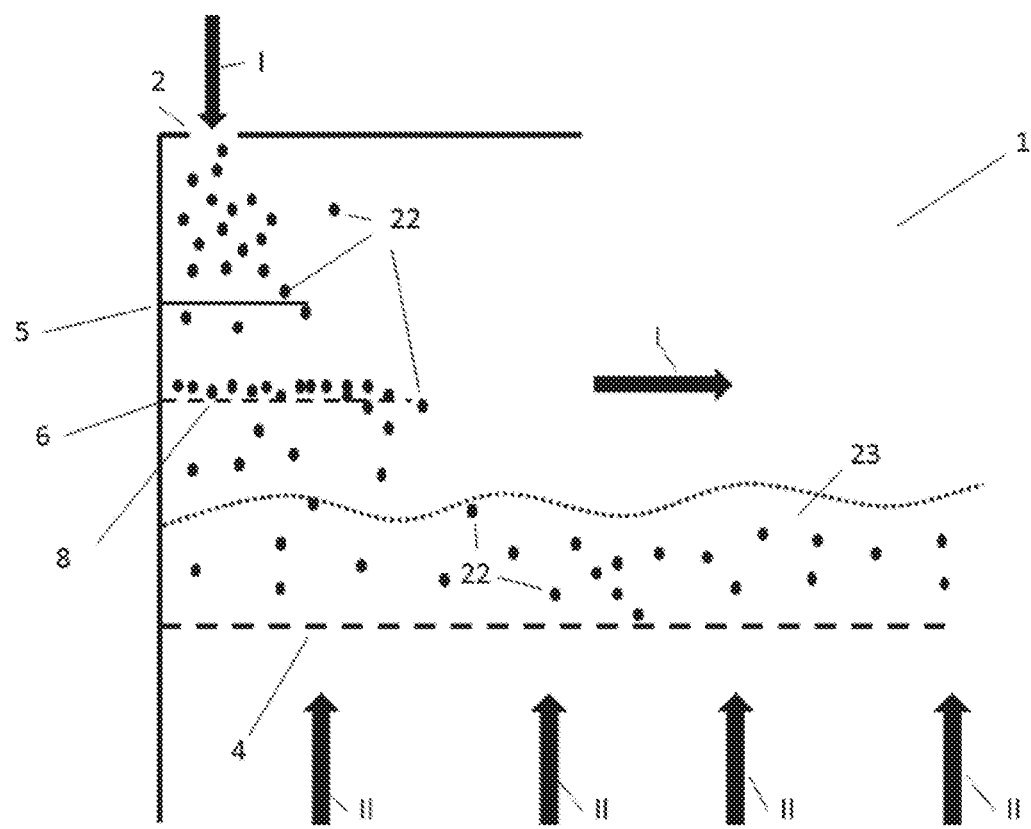
FIG. 3 is an enlarged schematic cross-sectional view of an example fluidized bed cooler in a region of a product inlet.

FIG. 3 shows an enlarged schematic cross section of a fluidized bed cooler of the invention in the region of the product inlet. The baffle plate (5) and the distributor plate (6) are disposed between the product inlet opening (2) and the perforated plate (4). The distributor plate, in an optional configuration, has openings (8). The baffle plate (5), as described above, reduces the velocity and hence the kinetic energy of the incoming product (22). The distributor plate (6) results in homogeneous introduction of the product (22) over a larger area into the fluidized bed (23) composed of fluid granule particles.

Figure 4:
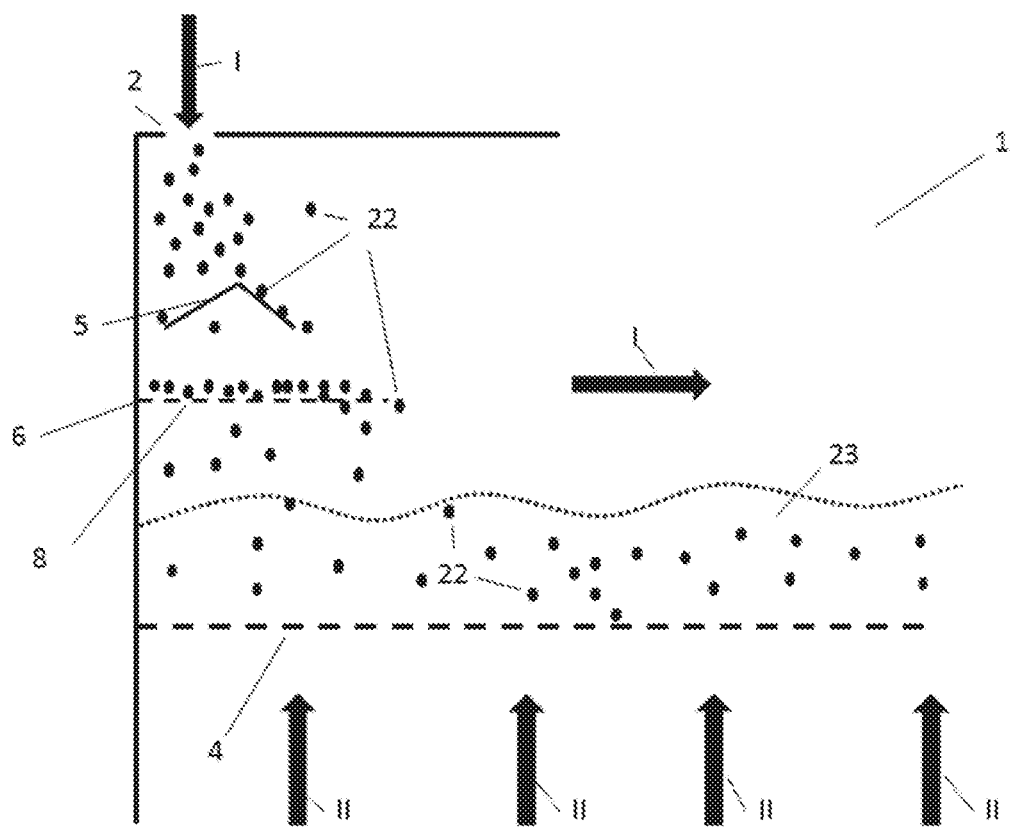
FIG. 4 is an enlarged schematic cross-sectional view of another example fluidized bed cooler in a region of a product inlet.

FIG. 4 shows an enlarged schematic cross section of a preferred embodiment of the fluidized bed cooler of the invention in the region of the product inlet. Apart from the baffle plate (5), the setup corresponds to that described in FIG. 3. The baffle plate (5) is preferably curved, and in the present example is in roof-shaped form. The curved basic shape surprisingly increases the stability and durability of the baffle plate (5) in the product stream (I) and distributes the product (22) more uniformly over the distributor plate (6).

LIST OF REFERENCE NUMERALS (1) cooler chamber
(2) product inlet opening
(3) product outlet opening
(4) perforated plate
(5) baffle plate
(6) distributor plate
(7) cooling medium entry opening
(8) openings
(21) air removal opening
(22) product (granular material)
(23) fluidized bed
(I) flow direction of the granulation product/product stream
(II) gas stream

What is claimed is:

1. A fluidized bed cooler for cooling a granular material that contains urea, the fluidized bed cooler comprising:
    a cooling chamber having a product inlet opening;
    a product outlet opening;
    a perforated plate disposed in the cooler chamber, wherein the product inlet opening is disposed above the perforated plate;
    a cooling medium entry opening disposed beneath the perforated plate;
    a baffle plate disposed between the product inlet opening and the perforated plate; and
    a distributor plate disposed between the baffle plate and the perforated plate.

2. The fluidized bed cooler of claim 1 wherein an area of the distributor plate is 10% to 50% greater than an area of the baffle plate.

3. The fluidized bed cooler of claim 1 wherein the baffle plate is planar or curved so as to be roof-shaped, trapezium-shaped, saddle-shaped, concentric, or three-dimensional Gaussian.

4. The fluidized bed cooler of claim 1 wherein at least one of the distributor plate or the baffle plate is configured as perforated plates.

5. The fluidized bed cooler of claim 1 wherein at least one of the baffle plate or the distributor plate comprises metals, metal alloys, composite materials, and/or plastics.

6. The fluidized bed cooler of claim 1 wherein at least one of the distributor plate or the baffle plate has openings with an average diameter of 10 mm to 50 mm.

7. The fluidized bed cooler of claim 1 wherein the distributor plate comprises borders.

8. The fluidized bed cooler of claim 1 wherein at least one of the distributor plate or the baffle plate has a reinforcement with the product inlet opening.

9. The fluidized bed cooler of claim 1 wherein the baffle plate has less than 10% of an area of the perforated plate.

10. The fluidized bed cooler of claim 1 wherein the baffle plate is disposed parallel to the perforated plate.

11. A method of cooling a granular fertilizer, the method comprising:
   introducing a granular material from a fluidized bed granulator or granulation promoter in the fluidized bed cooler of claim 1.

12. A fluidized bed granulation plant for production of a granular fertilizer, the fluidized bed granulation plant comprising:
   a fluidized bed granulator having a perforated granulator plate, a seed grain inlet, a fluidization gas inlet, and a melt nozzle with an atomization gas inlet;
   a first fluidized bed cooler;
   granulation promoters;
   sieves;
   crushers; and
   product coolers,
   wherein at least one of the first fluidized bed cooler or one or more of the product coolers includes:
   a cooling chamber having a product inlet opening;
   a product outlet opening;
   a perforated plate disposed in the cooler chamber, wherein the product inlet opening is disposed above the perforated plate;
   a cooling medium entry opening disposed beneath the perforated plate; and
   a baffle plate disposed between the product inlet opening and the perforated plate.

13. The fluidized bed granulation plant of claim 12 wherein at least one of the fluidized bed granulator, the product coolers, or the first fluidized bed cooler is connected to a waste air treatment unit.

14. The fluidized bed granulation plant of claim 13 wherein the waste air treatment unit comprises at least one of a scrubber or an acidic scrubber.

15. The fluidized bed granulation plant of claim 12 configured for the production of the granular fertilizer containing ammonium compounds, nitrates, phosphates, urea, elemental sulfur, ammonium sulfate, urea ammonium sulfate (UAS), or combinations thereof.

16. The fluidized bed granulation plant of claim 12 configured for the production of the granular fertilizer containing urea.

* * * * *